United States Patent [19]
Adolfsson

[11] Patent Number: 4,913,542
[45] Date of Patent: Apr. 3, 1990

[54] REAR VIEW MIRROR WITH TWO PARALLEL DISPLACED MIRROR PARTS
[75] Inventor: Rune Adolfsson, BorÅs, Sweden
[73] Assignee: SKF Nova AB, Gothenburg, Sweden
[21] Appl. No.: 148,558
[22] Filed: Jan. 26, 1988
[30] Foreign Application Priority Data
Jan. 27, 1987 [SE] Sweden ................ 8700303
[51] Int. Cl.⁴ ............. G02B 5/08; B60R 1/08
[52] U.S. Cl. ................. 350/612
[58] Field of Search ......... 350/612, 627, 626, 623, 350/624, 625, 626, 631, 632, 618, 606, 604

[56] References Cited
U.S. PATENT DOCUMENTS
2,663,225 12/1953 Blan ................. 350/627
3,131,250 4/1964 Ely .................. 350/627

FOREIGN PATENT DOCUMENTS
2601911 7/1977 Fed. Rep. of Germany ...... 350/612
3146486 6/1983 Fed. Rep. of Germany ...... 350/627
3243178 5/1984 Fed. Rep. of Germany ...... 350/612
3622304 10/1987 Fed. Rep. of Germany ...... 350/632

Primary Examiner—Jon W. Henry
Attorney, Agent, or Firm—Eugene E. Renz, Jr.

[57] ABSTRACT

In a rear view mirror intended primarily for mounting on a motor vehicle, the specular surface in order to obtain a limited transverse extension, is divided into at least two separate parts (4, 5), which are displaced relative each other, thus that they are situated in different planes.

2 Claims, 1 Drawing Sheet

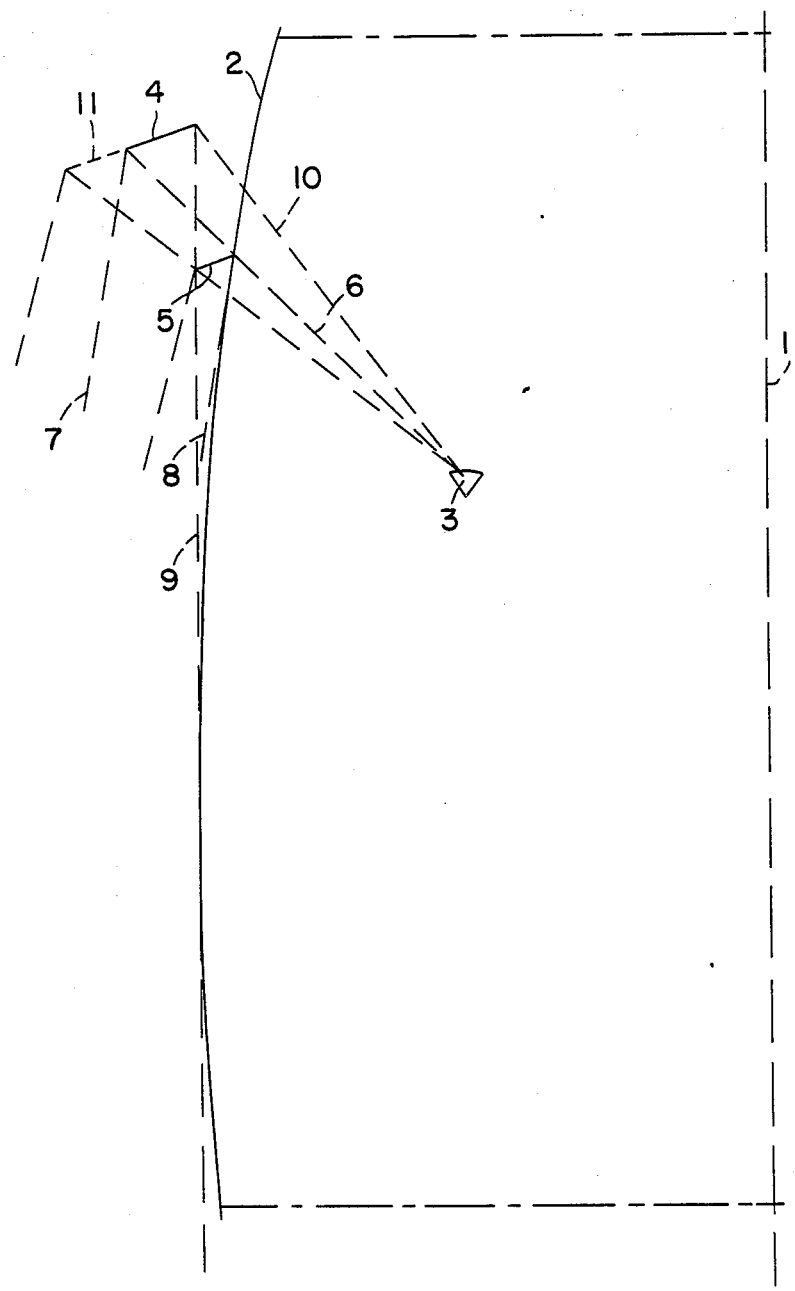

4,913,542

REAR VIEW MIRROR WITH TWO PARALLEL DISPLACED MIRROR PARTS

FIELD OF THE INVENTION

The invention refers to a rear view mirror, which primarily is intended for location on a vehicle in front of a viewer.

BACKGROUND OF THE INVENTION

In order to minimize the fuel consumption and to improve the performance of motor vehicles, particularly passengeer cars, the vehicle is often designed to give such a low air resistance as possible. It is thereby desired, that the surface of the vehicle projecting perpendicularly to the direction of motion of the vehicle is minimized. For traffic safety reasons external rear view mirrors form part of the compulsory equipment of passenger cars. A rear view mirror projects from the car body and thereby increases said surface and, therefore, the air resistance. The mirror must have a considerable horizontal extension for giving a sufficient area of visibility and it furthermore often must be located outside the car body side for allowing a free view straight rearwards, as the car body side is often curved and the mirror has to be located forward of the most broad portion of the car body.

Beside causing increased air resistance the projecting mirrors also form a maneuver obstacle, and they are also located thus that they are easily subjected to damages. They also may be dangerous for unprotected road users at a collision.

SUMMARY OF THE INVENTION

The purpose of the present invention is to provide a rear view mirror, which gives a broad area of visibility without having a large width, and according to the invention this is achieved by dividing the specular surface into at least two separate parts which are displaced so that they lie in different planes.

A rear view mirror according to the invention is particularly suited for use externally on a vehicle having a vehicle body, which has its broadest part behind the rear view miror. Thus, the second mirror part is situated between the vehicle body side on a line which is parallel to the longitudinal axis of the vehicle and forms a tangent to the vehicle body at the most broad portion of the vehicle body, whereas the first mirror part is situated on the opposite side of said line. This arrangement provides a wide area of visibility at the same time as it projects a rather short distance from the vehicle body side.

BRIEF DESCRIPTION OF THE DRAWINGS

Hereinafter the invention will be further described with reference to the accompanying drawing, which shows an explanatory view of a rear view mirror according to an embodiment of the invention provided on the car body of a passenger car.

DETAILED DESCRIPTION OF THE PREFERRED EMBODIMENT

The figure shows schematically a passenger car with a longitudinal symmetry axis 1 and a car body side 2. A rear view mirror 4,5 is located obliquely in front of the viewer on the external car body side 2. The specular surface of the rear view mirror is divided into at least two separate parts 4 and 5, respectively, the first part 4 of which is located farther away from the viewer and the second part 5 of which is located closer to the viewer. The areas of visibility of both the parts adjoin to each other, when the viewer's eyes are in a given position. The position 3 is then such, that a visual line 6 passes through the left or the right edge respectively on the specular surfaces on the parts 4 and 5. Along this line are reflected parallel beams 7,8, which incide against the corresponding edge on said specular surfaces. The angle a formed by the lines 6 and 7 thus is equal to the angle B formed by the lines 6 and 8. This angle is the biggest angle formed by incident beams and by beams reflected on the mirror part 4 and perceived by the viewer 3. At the same time, this is the smallest angle formed by the incident beams and by beams reflected on the mirror part 5 and perceived by the viewer 3. All other incident beams and beams reflected against or from the part 4, respectively and perceived by the viewer from smaller angles than corresponding beams against or from the part 5, respectively. The part 4 may preferably be located thus that view directly rearwards is ascertained, even if the car body side 2 is curved to convex form, such as shown in the drawing, and the mirror is located forward of the broadest car body portion. The part 5 thereby is located between the car body side 2 and a line 9, which is parallel to the longitudinal vehicle axis 1, and forms a tangent to the car body side 2 at the broadest portion of the car body, thus that the part 5 will not block the beam inciding directly from behind and which coincides with the line 9 and is reflected in the mirror part 4 to the point 3 as beam 10. The mirror part 4 is located on the opposite side of the mentioned line 9, whereby this mirror part allows view directly rearwards. By means of the part 5 the area of visibility of the viewer is made wider, thus that it will be as wide as in a single mirror, comprising the part 4 increased with the intimated portion 11.

It is evident that a mirror incorporating the reflecting surfaces 4 and 11 and attachments to the car body, which hold the mirror at a sufficient distance from the car body, i.e. outside the line 9, form a bigger air resistance together than the mirror composed by the reflecting parts 4 and 5 and attachments for these parts. The part 5 is smaller than the imagined part 11 and may be located near the car body without the car body blocking the sight, whereby also the space between the line 9 and the car body can be used for location of a reflecting surface. This space in known rear view mirror designs is occupied by attachment members only.

The rear view mirror of course can be designed thus that the reflecting surface is divided into more than two parts if so is desired. If it is not required to have a view straight rearwards, it is possible to give the parts a more free location in relation to each other. A number of parts e.g. can be located in a row after each other, whereby the row extends about parallel to the line 9, or follows the car body side 2. The parts may thereby be located in or in connection to a side window in the car body. The specular surfaces may be curved in order to give a big angle of view. The curvature thereby does not need to be uniform, but may have varying radii. In the case the specular surfaces are plane, they are preferably located in parallel to each other. When the specular surfaces of parts 4 and 5 are parallel and plane it is obtained an overlapping of the visual field corresponding to the distance between the lines 7 and 8 in the figure. This has only a small practical importance when viewing objects situated at long distances from the mirror. If the mirror parts are made individually adjustable it is possible to adjust them thus that overlapping is avoided regarding objects situated behind a certain distance from the mirror. In that case is obtained a play in the visual field for objects situated farther rearward from the mirror, but instead the viewing angle rearwards is increased.

What is claimed is:

1. In combination with a vehicle, a mirror system comprising a first mirror part (4) having a first reflecting surface mounted on the exterior of the vehicle located at a predetermined distance from a viewer within the vehicle, a second mirror part (5) mounted exteriorly on the vehicle closer to the viewer than said first mirror part (4) and having a second reflecting surface parallel to said first reflecting surface, the outer side edge of the first mirror part (4) being generally parallel to and vertically disposed with the inner side edge of the second mirror part (5), said vertically disposed edges lying along a visual line (6) originating from a viewer within the vehicle, and said mirror parts (4, 5) located on opposite sides of a line (9) tangent to the exterior side of the vehicle.

2. The combination of claim 1 having said second mirror part (5) situated between a vehicle body side (2) and said line (9), said line (9) forming a tangent to the vehicle body side (2) at the broadest portion of the vehicle body.

* * * * *